(12) United States Patent
Sakakibara

(10) Patent No.: US 6,860,306 B2
(45) Date of Patent: Mar. 1, 2005

(54) SLIP-PREVENTING DEVICE FOR VEHICLE TIRE

(76) Inventor: Kouichi Sakakibara, 1-103-1, Sugaminami Hotsu-cho, Hashima-shi, Gifu-ken (JP), 501-6335

( * ) Notice: Subject to any disclaimer, the term of this patent is extended or adjusted under 35 U.S.C. 154(b) by 0 days.

(21) Appl. No.: 10/267,175

(22) Filed: Oct. 9, 2002

(65) Prior Publication Data

US 2003/0084976 A1 May 8, 2003

(30) Foreign Application Priority Data

Nov. 5, 2001 (JP) .......................................... 2001-390664
Dec. 28, 2001 (JP) .......................................... 2001-402096

(51) Int. Cl.⁷ ............................................. B60C 27/00
(52) U.S. Cl. ................................ 152/225 R; 152/218
(58) Field of Search ................................ 152/208, 210, 152/213 A, 217, 218, 219, 222, 225 R, 223

(56) References Cited

U.S. PATENT DOCUMENTS

| | | | | |
|---|---|---|---|---|
| 1,020,489 A | * | 3/1912 | Gaylor | ................... 152/225 R |
| 1,247,760 A | * | 11/1917 | Wengraf | ...................... 267/74 |
| 2,426,683 A | * | 9/1947 | Harrop | ........................ 152/216 |
| 3,198,233 A | | 8/1965 | Aler | |
| 3,683,990 A | * | 8/1972 | Detwiler | .................. 152/225 R |
| 4,378,833 A | * | 4/1983 | Lindblad et al. | ............. 152/226 |
| 6,450,224 B1 | * | 9/2002 | Ward | ........................... 152/218 |
| 6,619,353 B1 | * | 9/2003 | Kim | ........................ 152/225 R |

FOREIGN PATENT DOCUMENTS

| | | |
|---|---|---|
| JP | 35-28806 Y | 12/1933 |
| JP | 48-14703 U | 2/1973 |
| JP | 48-46303 U | 6/1973 |
| JP | 49-2043 B | 1/1974 |
| JP | 51-158039 U | 12/1976 |
| JP | 54-55003 U | 4/1979 |
| JP | 54-55903 U | 11/1979 |
| JP | 53-6906 A | 12/1988 |
| JP | 3-16813 A | 1/1991 |
| JP | 4-11705 U | 1/1992 |
| JP | 5-319042 A | 12/1993 |
| JP | 10-315724 A | 12/1998 |
| JP | 2000-289419 A | 10/2000 |

* cited by examiner

Primary Examiner—Frantz F. Jules

(57) ABSTRACT

A slip-preventing device of a tire has a plurality of arm frames each of which is contacted with an inner sidewall, a tread and an outer sidewall of the tire. The arm frame has a link unit at a side of the outer sidewall of the tire. The arm frames are linked with each other by the link units.

3 Claims, 19 Drawing Sheets

F I G. 2
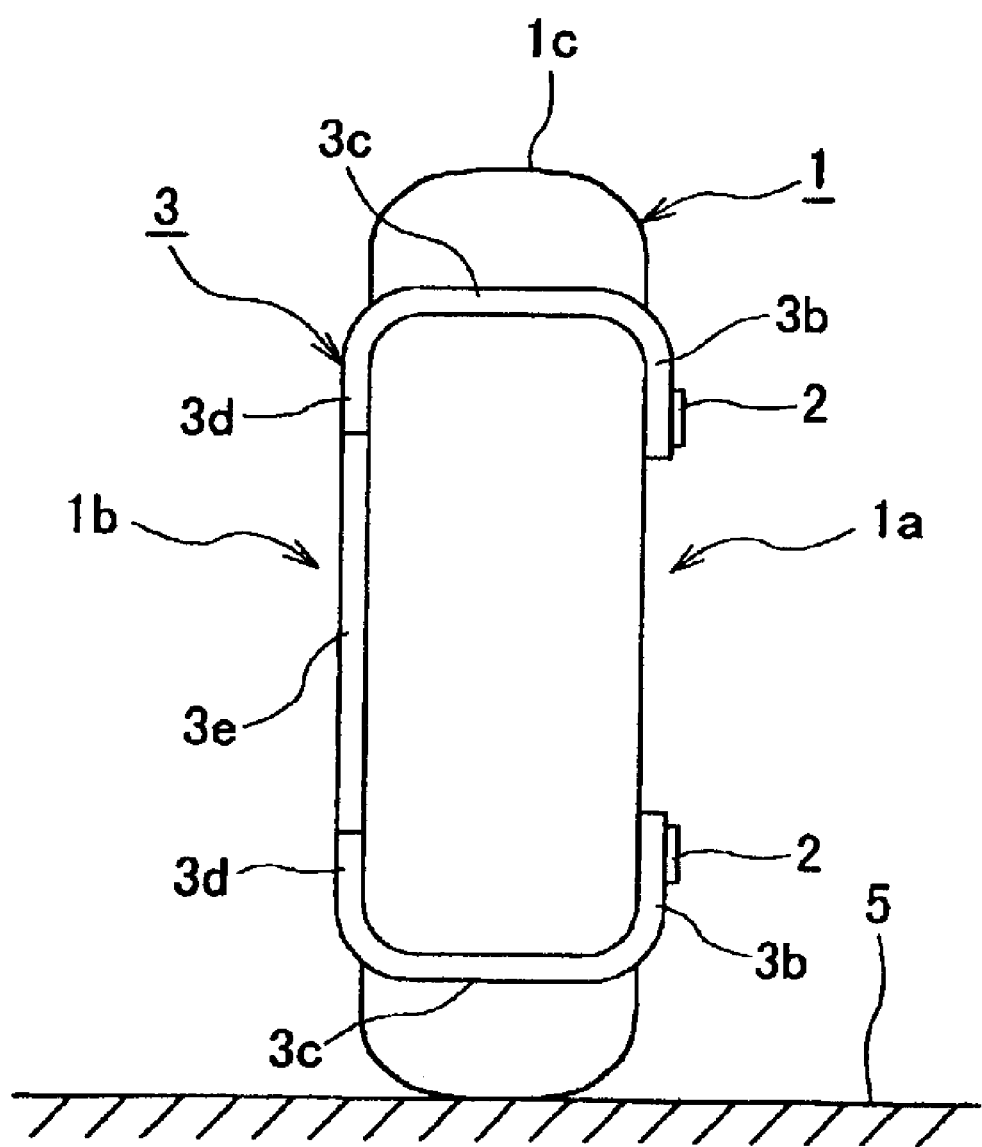

F I G. 4
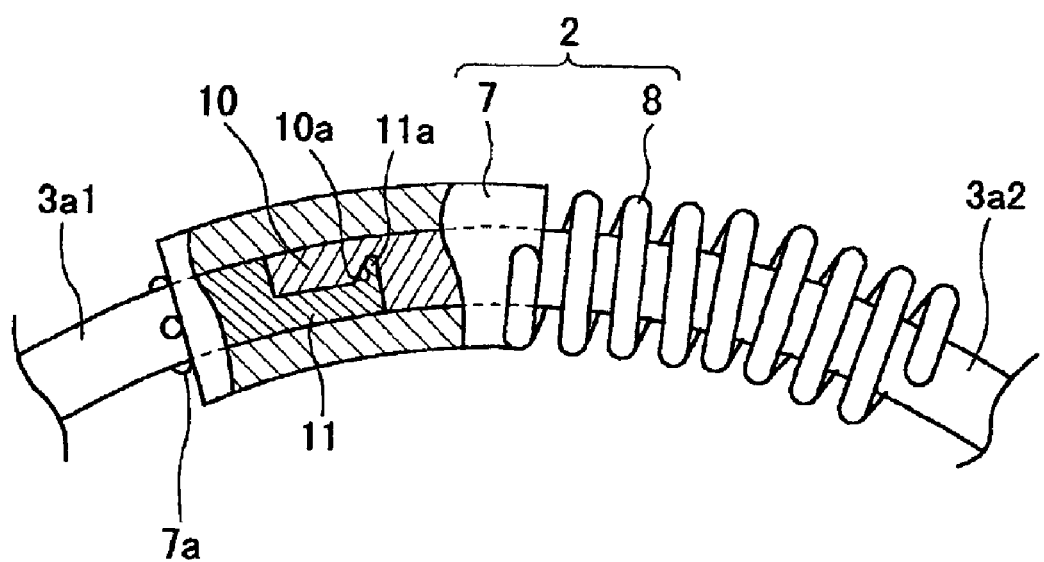

F I G. 1 2
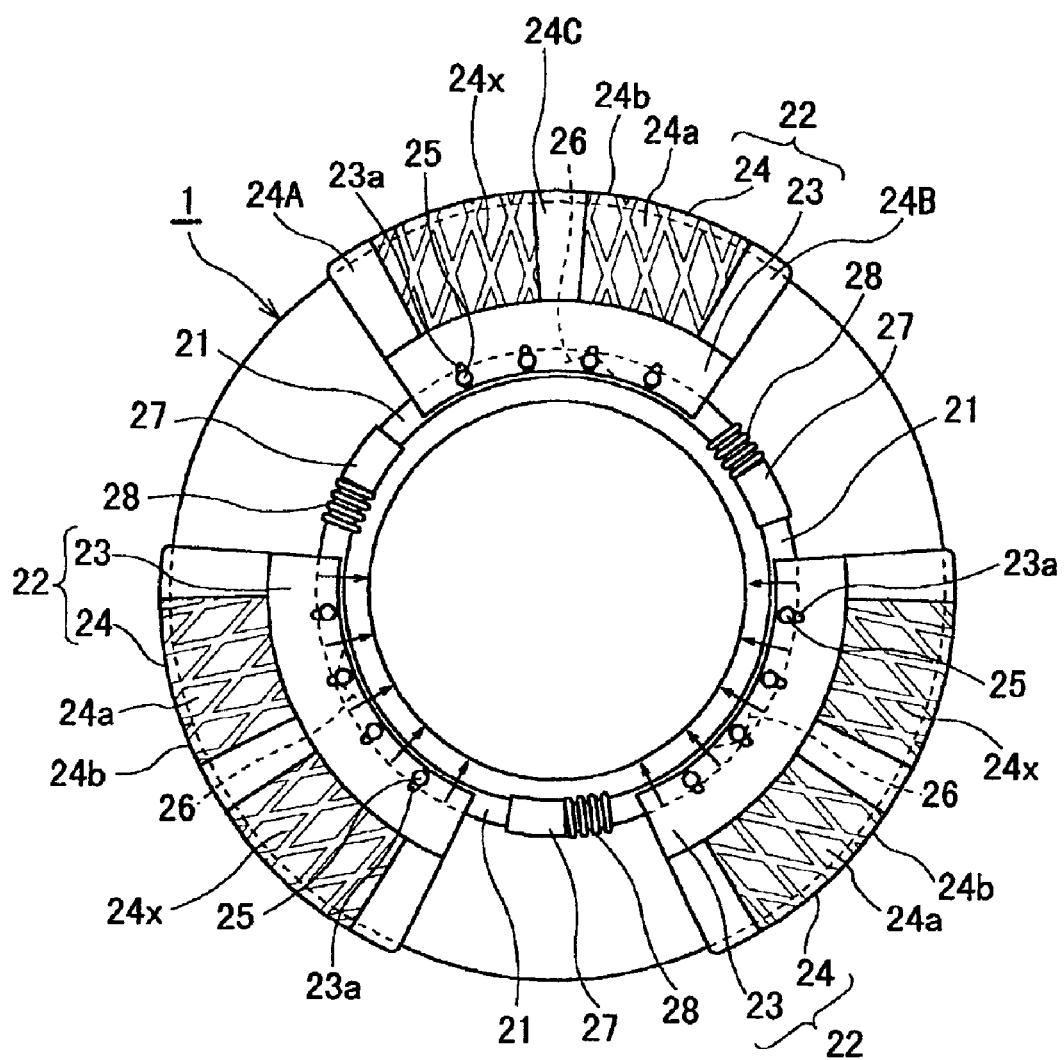

F I G. 1 3
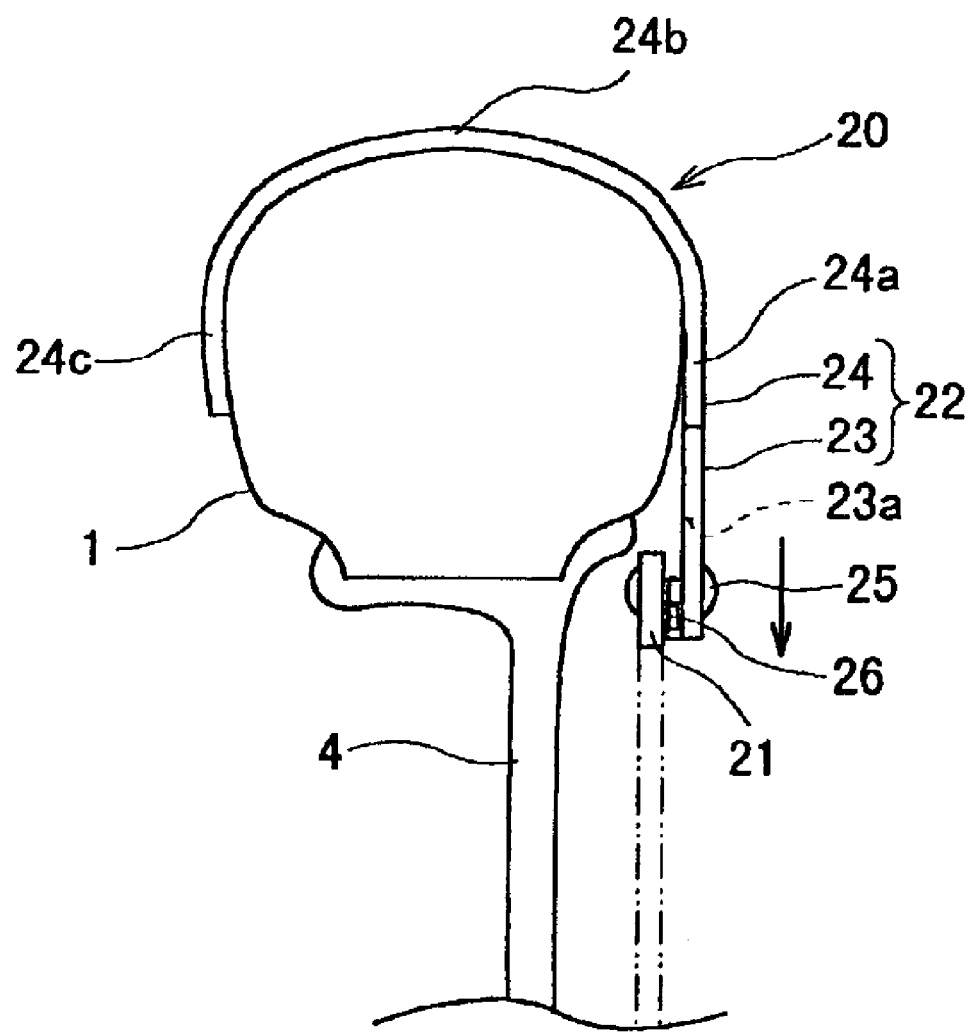

F I G. 1 5
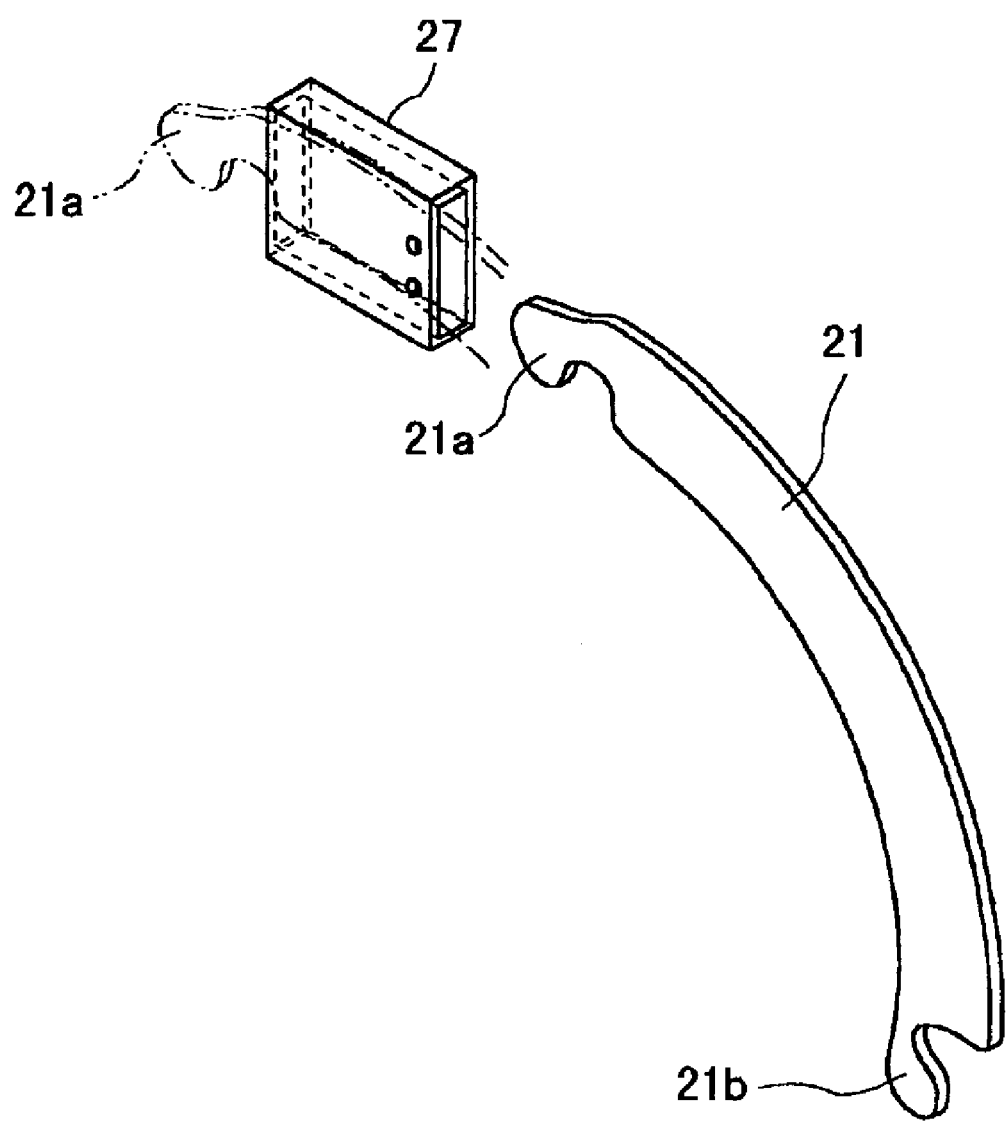

F I G. 1 7
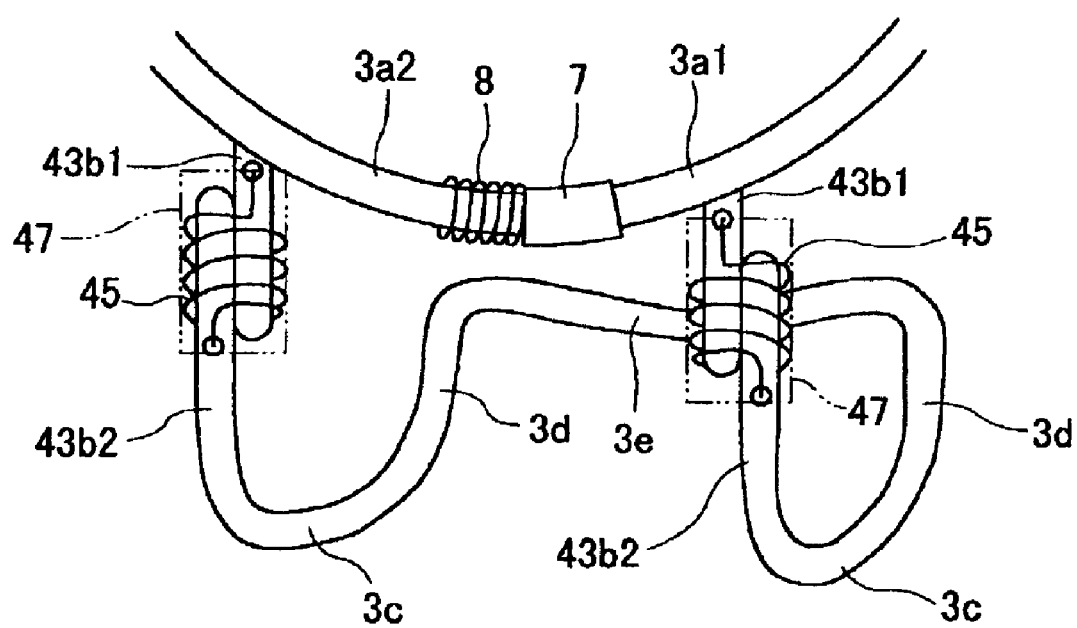

F I G. 1 9
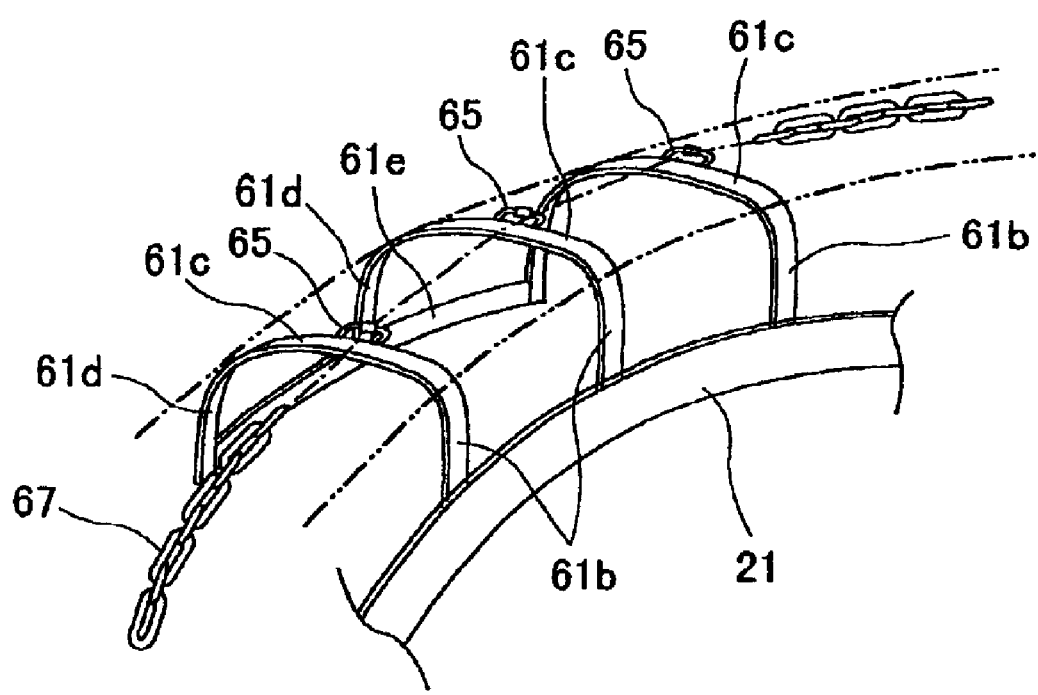

SLIP-PREVENTING DEVICE FOR VEHICLE TIRE

BACKGROUND OF THE INVENTION

1. Field of the Invention

This invention relates to a slip-preventing device for a tire that is attached to the tire of an automobile or the like so as to prevent the tires from slippage on a snow-covered road or a frozen road in winter.

2. Description of the Related Art

Conventionally, a variety of tire chains are supplied to improve a slip preventing or traction effects of normal tires. Generally, it is very laborious and takes much time to fit the conventional tire chains on the tires. Such work is very complicated and troublesome for users who handle the tire chains once or twice a year. Attaching the tire chains needs much time for such users. Particularly, the fitting work becomes more difficult under bad condition such as the work on a snow-covered road. Moreover, the attaching work is very hard for users who are weak such as women or the like.

BRIEF SUMMARY OF THE INVENTION

It is an object of the invention to provide a slip-preventing device for a tire that enables anyone to fit it on a tire in a short time.

According to a first aspect of the invention, there is provided a slip-preventing device comprising a plurality of arm frames having a shape contacting with an inner sidewall, a tread and an outer sidewall of a tire and a link unit provided at an outer side of the tire. The link unit links the arm frames with each other. With such features, the slip-preventing device can be made into the simplest structure. The slip-preventing device can be held on the tire by itself by connecting the arm frames. That is, the slip-preventing device is continuous at the inner sidewall, the tread and the outer sidewall of the tire, so that it never physically comes off the tire. At the time of gripping by rotating the tire, a weight of a vehicle is applied to a portion of the arm frame that touches a ground surface of a road. Particularly, a width of the tire enlarges to inside and outside directions, thereby increasing a force to hold the arm frame on the tire. A set of the arm frames are linked at the inner sidewall, the tread and the outer sidewall so as to round the tire. Consequently, the set of the arm frames as a whole absorbs vibration. Moreover, the arm frames become in a centripetal state so that there arises friction at the portion of the arm frame that touches the ground surface, thereby acting as the slip-preventing device.

The slip-preventing device of the tire may provide a free joint unit on the arm frame. In this case, the free joint unit defines a connecting portion and functions to move in the arm frame. Thus, the free joint unit releases a force applied to the arm frame or vibration at the time of rotating the tire or braking. Moreover, the free joint serves to facilitate installation to the tire.

The slip-preventing device of the tire may have an elastic body fitted on the free joint unit in the arm frame. In this case, the elastic body is composed of a spring, rubber or the like. When the elastic body is fitted on the free joint unit, it facilitates much more the installation to the tire and improves much more the absorption of the vibration or noise. Particularly, using them in combination improves much more the performance of the slip-preventing device.

According to a second aspect of the invention, there is provided

Further objects and advantages of the invention will be apparent from the following description, reference being had to the accompanying drawings, wherein preferred embodiments of the invention are clearly shown.

BRIEF DESCRIPTION OF THE DRAWINGS

FIG. 2 is a side view of the slip-preventing device according to the first embodiment of the invention that is installed on the tire.

FIG. 4 is a partially cut-away view of a link unit of the slip-preventing device according to the first embodiment of the invention.

FIG. 11b is a view seen from an arrow direction A of FIG. 11a.

FIG. 12 is a front view of a slip-preventing device according to a sixth embodiment of the invention that is installed on the tire.

FIG. 13 is an explanatory drawing showing a lateral side of the slip-preventing device according to the sixth embodiment of the invention that is installed on the tire.

FIG. 15 is a perspective view of the outer side component and a link tube of the slip-preventing device according to the sixth embodiment of the invention.

FIG. 17 is a perspective view of a main part of a slip-preventing device according to an eighth embodiment of the invention.

FIG. 19 is a perspective view of a main part of a slip-preventing device according to a tenth embodiment of the invention.

DETAILED DESCRIPTION OF THE INVENTION

Figure 1:
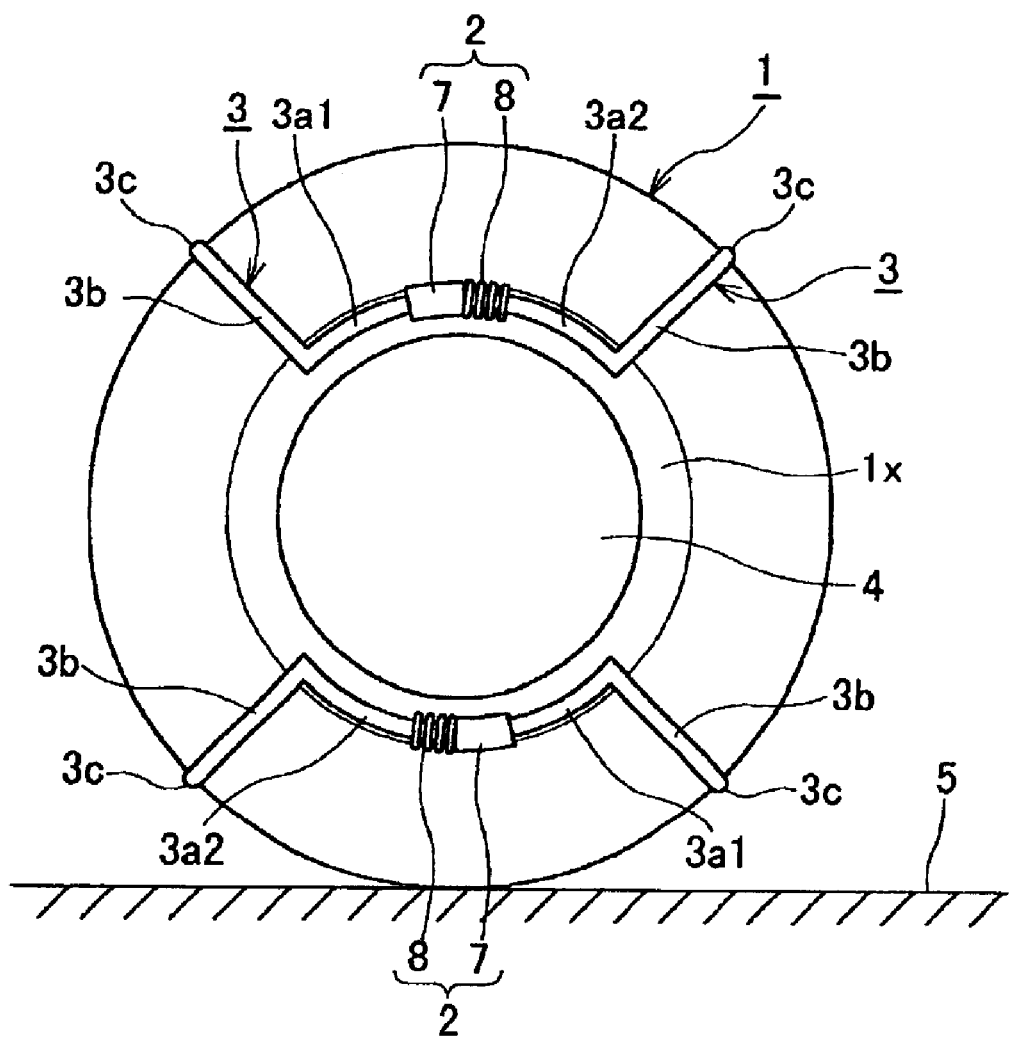
FIG. 1 is a front view of a slip-preventing device according to a first embodiment of the invention that is installed on a tire.

Several embodiments of the invention are described hereunder referring to the attached drawings. The same reference character is used to show the same element throughout the several embodiments.

First Embodiment

Referring to FIGS. 1 to 5, a slip-preventing device according to a first embodiment of the invention has a plurality of arm frames 3. Each of the arm frames 3 has a shape contacting with an inside surface, a ground-touching surface and an outside surface of a tire 1. Each of the arm frames 3 has a link unit 2 provided at an outer side of the tire 1. The link unit 2 links the arm frames 3 with each other. In detail, the slip-preventing device has two arm frames 3. Each of the arm frames 3 has a pair of outer side components 3a1 and 3a2, a pair of crossing components 3b, 3c, 3d and the link unit 2. Each of the outer side components 3a1, 3a2 has essentially an arc shape that extends circumferentially along part of an inner periphery of an outer sidewall 1a constituting the outside surface of the tire 1. The outer side component 3a1, 3a2 is supported while contacted with the sidewall 1a of the tire 1 near a beat 1x. A pair of the outer side components 3a1, 3a2 are arranged at a fixed interval in a circumferential direction of the sidewall 1a of the tire 1. Specifically, each of the arm frames 3 is shaped such that a gap between base ends of the outer side components 3a1 and 3a2 is spaced apart at an angle of about 90 degrees in the circumferential direction of the outer sidewall 1a. Moreover, each of the outer side components 3a1, 3a2 in itself has an arc shape extending in the circumferential direction of the outer sidewall 1a at an angle of about 45 degrees.

Each of the crossing components 3b, 3c, 3d has essentially a channel shape extending from the base end of each of the outer side components 3a1, 3a2 to the outer sidewall 1a, a tread 1c constituting the ground-touching surface and an inner sidewall 1b constituting the inside surface of the tire 1. Each of the crossing components 3b, 3c, 3d is composed of an outside portion 3b, a bottom portion 3b and an inside portion 3c. The outside portion 3b is supported closely on the sidewall 1a so as to extend in the radial direction of the tire 1 along the sidewall 1a. The bottom portion 3c is supported closely on the tread 1c so as to extend in a width direction of the tire 1 along the tread 1c. The inside portion 3d is supported closely on the sidewall 1b so as to extend in the radial direction of the tire 1 along the sidewall 1b. The pair of the crossing components 3b, 3c, 3d is arranged at an angle of about 90 degrees corresponding to the angle between the base ends of the pair of the outer side components 3a1, 3a2.

Each of the arm frames 3 further has an inner side component 3e. The inner side component 3e connects leading ends of the pair of the crossing components 3b, 3c, 3d with each other. The inner side component 3e has essentially an arc shape that extends circumferentially along part of an inner periphery of an inner sidewall 1b. The inner side component 3e is supported while contacted with the sidewall 1b of the tire 1 at a position a little outer than the beat 1x. The inner side component 3e has the arc shape extending at an angle of about 90 degrees corresponding to the angle between the base ends of the pair of the outer side components 3a1, 3a2 and the angle of arrangement of the pair of the crossing components 3b, 3c, 3d. For example, the arm frame 3 may be made of a round rod made of steel or alloy that is bent to form the outer side component 3a1, 3a2, the crossing component 3b, 3c, 3d and the inner side component 3e. Alternatively, the arm frame 3 may be formed integrally of a synthetic resin material such as a fiber-reinforced plastic (FRP or CFRP) and an engineering plastic. Moreover, the arm frame may be made of an elongate material of another shape than the round rod having round cross-section, such as a rod having an elliptical cross-section, a flat bar having a rectangular cross-section.

The link unit 2 has a link tube 7 and a compression coil spring 8. In detail, as shown in FIG. 4, a leading end portion 11 of the one outer side component 3a1 has a cross-section of about one half of a cross-section of the outer side component 3a1. A hooking protrusion 11a is integrally formed at a leading end of the leading end portion 11. A leading end portion 10 of the other outer side component 3a2 has a cross-section of about one half of a cross-section of the outer side component 3a2. A hooking dent 10a is integrally formed at a base end of the leading end portion 10. The leading end portion 11 and the leading end portion 10 are engaged so that the hooking protrusion 11a hooks in the hooking dent 10a. Thus, the outer side components 3a1 and 3a2 are linked and fixed in their axial direction or longitudinal direction. The link tube 7 is mounted on an outer periphery of the leading end 11 so as to slide in the axial direction. The ling tube 7 has an inner peripheral surface corresponding to the cross-section of the outer side component 3a1, 3a2. For example, in case the outer side component 3a1, 3a2 is made of the round bar, the link tube 7 has an inner peripheral surface of a corresponding round cross-section. The compression coil spring 8 has its one end (left end in FIG. 4) fixed on one end (right end in FIG. 4) of the ling tube 7.

The other end (right end in FIG. 4) of the spring 8 is fixed on an outer peripheral surface of the outer side component 3a2 while spaced apart at a predetermined distance from the leading end of the outer side component 3a2. A plurality of stopping protrusions 7a are integrally formed on the outer peripheral surface of the outer side component 3a1 at a fixed distance from the leading end and at fixed intervals in the circumferential direction. The coil spring 8 urges the link tube 7 toward the outer side component 3a1 so as to get the other end of the link tube 7 contacted with the protrusions 7a. Thus, the link tube 7 is regulated and blocked from sliding over the protrusions 7a. A mounting position of the spring 8 or the position of the protrusions 7 are set such that the spring 8 becomes in a little compressed state (initial state) at that time. Moreover, the link tube 7 covers a whole of the linked leading end portions 10 and 11 at that time. That is, the linked leading end portions 10 and 11 are located at substantially a center of the link tube 7.

Figure 6:
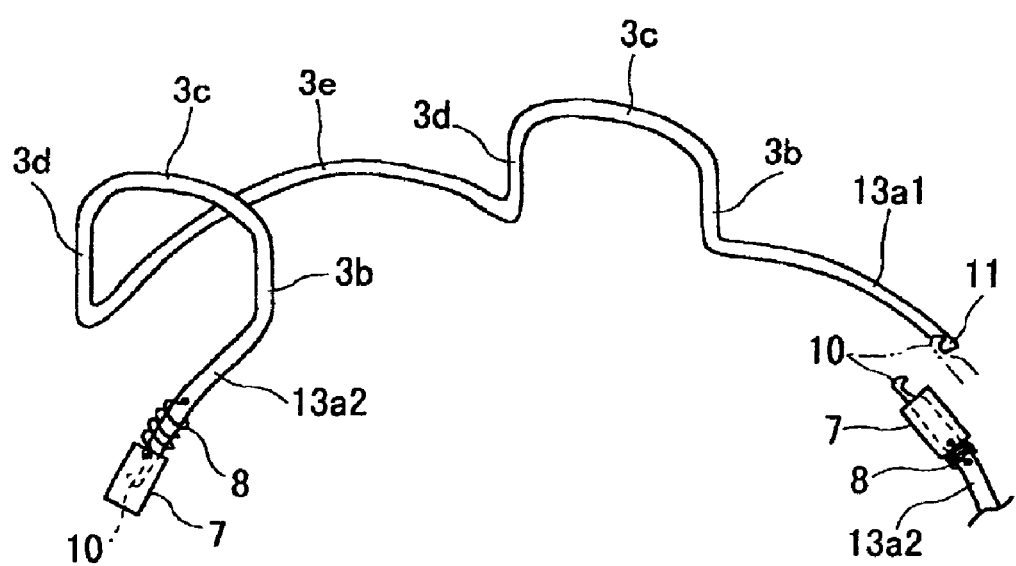
FIG. 6 is a perspective view showing how arm frames are lined by the link unit of the slip-preventing device according to the first embodiment of the invention.

Thus, the leading ends of the outer side components 3a of the two arm frames 3 are respectively inserted and separated in the circumferential direction via the link unit 2 and linked detachably into one body. Consequently, the crossing components 3b, 3c, 3d of the two arm frames 3 are arranged at fixed intervals over an entire circumference of the tread 1c. That is, as shown in FIG. 6, the link tube 7 is slid toward the outer side component 3a2 against the urging force of the spring 8 (see the right link tube 7 in FIG. 6), so that the outer side components 3a1 and 3a2 are linked or released with each other. After the outer side components 3a1 and 3a2 are linked, the link tube 7 automatically returns to its original position (see the left link tube 7 in FIG. 6) by the urging force of the spring 8 so as to cover the leading end portions 10 and 11 as the linking portion.

In order to install the slip-preventing device on the tire, first, two arm frames 3 are prepared and one of the arm frames 3 is moved toward the tire 1 from one side, e.g. the left side. Then, the crossing components 3b, 3c, 3d are fitted on part of the tire 1, e.g. the left half thereof. At this time, the outside portion 3b, the bottom portion 3c and the inside portion 3d are supported closely on the outer sidewall 1a, the tread 1c and the inner sidewall 1b, respectively. Next, keeping such state, the other of the arm frames 3 is moved toward the tire 1 from the other side, e.g. the right side. Then, the crossing components 3b, 3c, 3d are fitted on the rest part of the tire 1, e.g. the right half thereof. At this time, the outside portion 3b, the bottom portion 3c and the inside portion 3d are supported closely on the outer sidewall 1a, the tread 1c and the inner sidewall 1b, respectively. Thus, the slip-preventing device can be easily installed on the part of the tire 1 other than the surface that is touching the ground at that time, namely, on the part that is disposed in the air. Consequently, laborious work is unnecessary such as rotating the tire 1 for installation.

Figure 3:
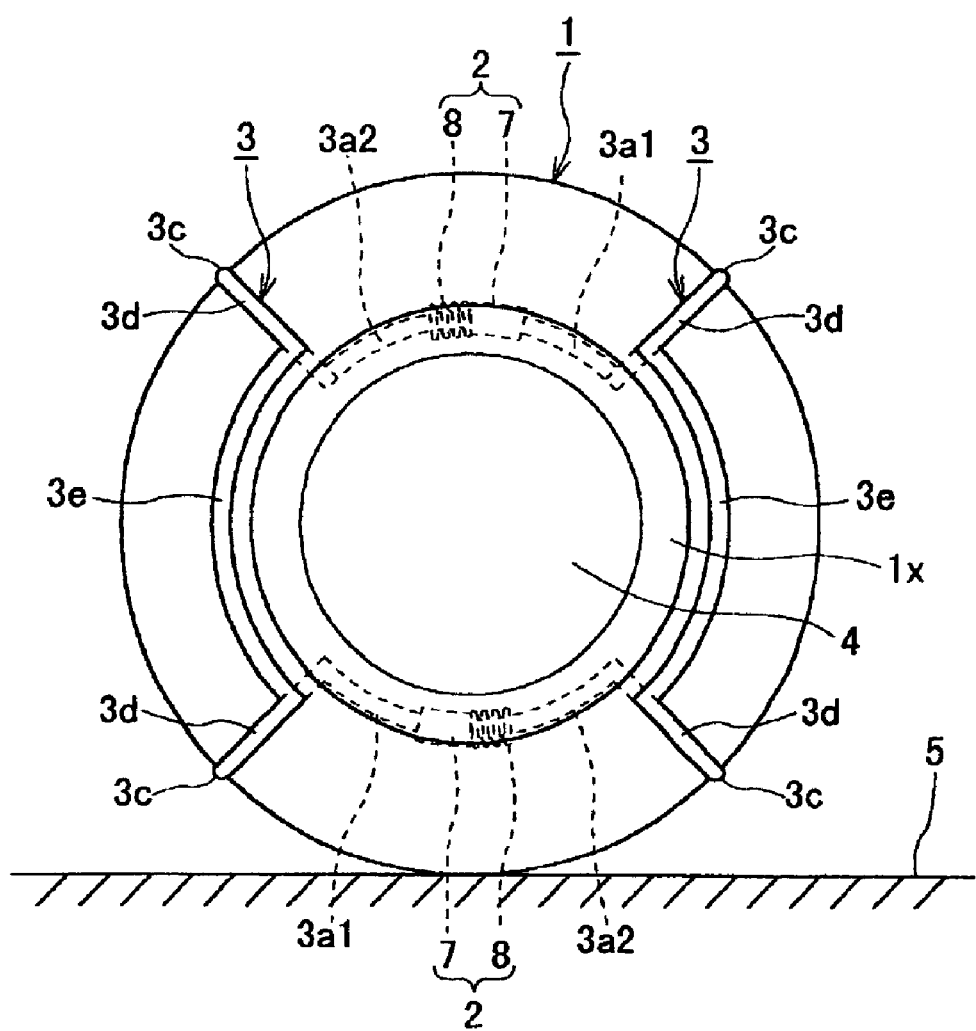
FIG. 3 is a rear view of the slip-preventing device according to the first embodiment of the invention that is installed on the tire.
Figure 5:
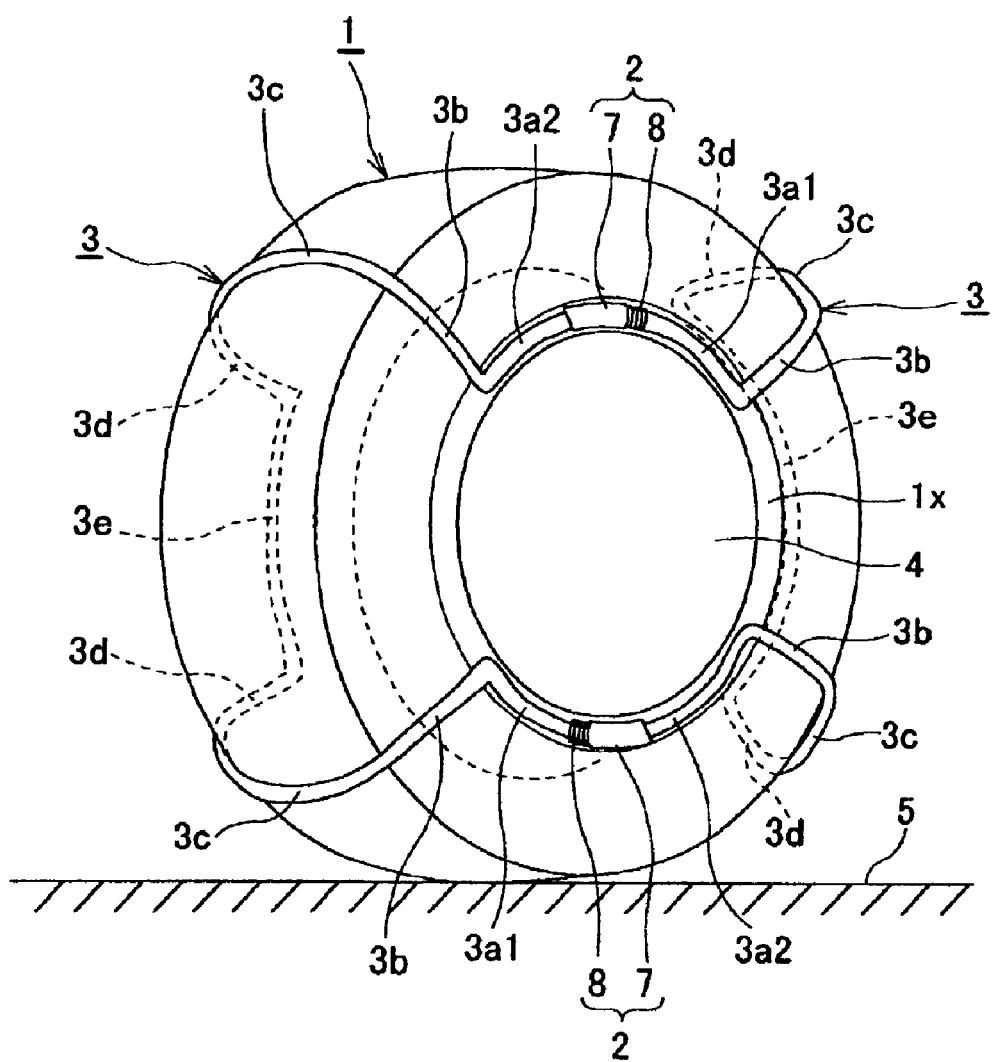
FIG. 5 is a perspective view of the slip-preventing device according to the first embodiment of the invention that is installed on the tire.

Then, keeping such state, both the arm frames 3 are moved to each other. Thereafter, the outer side component 3a1 of the one of the opposed arm frames 3 and the outer side component 3a2 of the other of the arm frames 3 are linked by the link unit 2, while the outer side component 3a2 of the one of the opposed arm frames 3 and the outer side component 3a1 of the other of the arm frames 3 are linked by the link unit 2. Thus, as shown in FIGS. 1, 3 and 5, the adjacent crossing components 3b, 3c, 3d of the opposed arm frames 3 are disposed to each other at a predetermined interval. The crossing components 3b, 3c, 3d of each of the arm frames 3 are disposed at a predetermined interval in the same arm frame 3. At this time, it is preferable to make the dimension between the outside portion 3b and the inside portion 3d a little smaller than the width of the tire 1 or the dimension between the sidewalls 1a and 1b. In this case, the inside portions 3b and the inside portions 3d of the crossing components, the outer side components 3a, 3a2 and the inner side components 3e are pressed on the sidewalls 1a and 1b of the tire 1. Moreover, it is preferable to make the diameter of the linked two arm frames 3 or the dimension between the bottom portions 3c of the radially opposite crossing components a little smaller than the diameter of the tread 1c of the tire 1. In this case, the bottom portions 3c of the crossing components are pressed on the tread 1c of the tire 1. Furthermore, it is preferable to set the angular interval of disposition of the crossing components 3b, 3c, 3d or the length and the angular interval of disposition of the outer side components 3a1, 3a2 so that the crossing components 3b, 3c, 3d are disposed at constant angular intervals. Specifically, in the first embodiment, it is preferable that those two arm frames 3 are mounted and arranged at an angle of 180 degrees in the circumferential direction of the tire 1, respectively, thereby extending 360 degrees in total and that the opposite crossing components 3b, 3c, 3d of each of the arm frames 3 and the adjacent crossing components 3b, 3c, 3d of the linked two arm frames 3 are arranged in the circumferential direction of the tire 1 at intervals of about 90 degrees, respectively.

As described above, the first embodiment of the slip-preventing device can be easily installed on the tire 1 in a short time only by fitting the pair of the arm frames 3 having the same structure from the opposite directions of the tire 1 and linking the opposed arm frames 3 via the link unit 2. The slip-preventing device installed on the tire 1 is held on the outer peripheral surface of the tire 1 while pressed thereon, so that the slip-preventing device rotates in synchronization with the tire 1 at the time of running of the car or the like. When running, the bottom portion 3c of the crossing components grips a road surface 5 such as a snow-covered road, thereby performing required slip-preventing function or traction effects. The bottom portion 3c serves to prevent the slip when it is positioned between the tread 1c of the tire 1 and the road surface 5. At this time, the bottom portion 3c is applied with a pressing force according to a weight of a vehicle between the tread 1c of the tire 1 and the road surface 5. Consequently, the bottom portion 3c does not slip on the tread 1c but is surely held between the tread 1c of the tire 1 and the road surface 5, thereby sufficiently performing the expected slip-preventing function. At this time, the tire 1 expands in the width direction by the weight of the vehicle. Consequently, the outside portion 3b and the inside portion 3d of the crossing component as well as the outer side components 3a1, 3a2 and the inner side component 3e are pressed on the sidewalls 1a and 1b of the tire 1, respectively, thereby held on fixed positions without fail. Accordingly, the first embodiment can prevent such trouble that the arm frame 3 slips in the circumferential direction of the tire 1 to cause shift of the position on the tire 1. As a result, the slip-preventing device can sufficiently perform the traction function. Moreover, a complete set can be constituted by use of two arm frames of the same structure, thereby reducing manufacturing costs of the device and making the device inexpensive.

Second Embodiment

Figure 7:
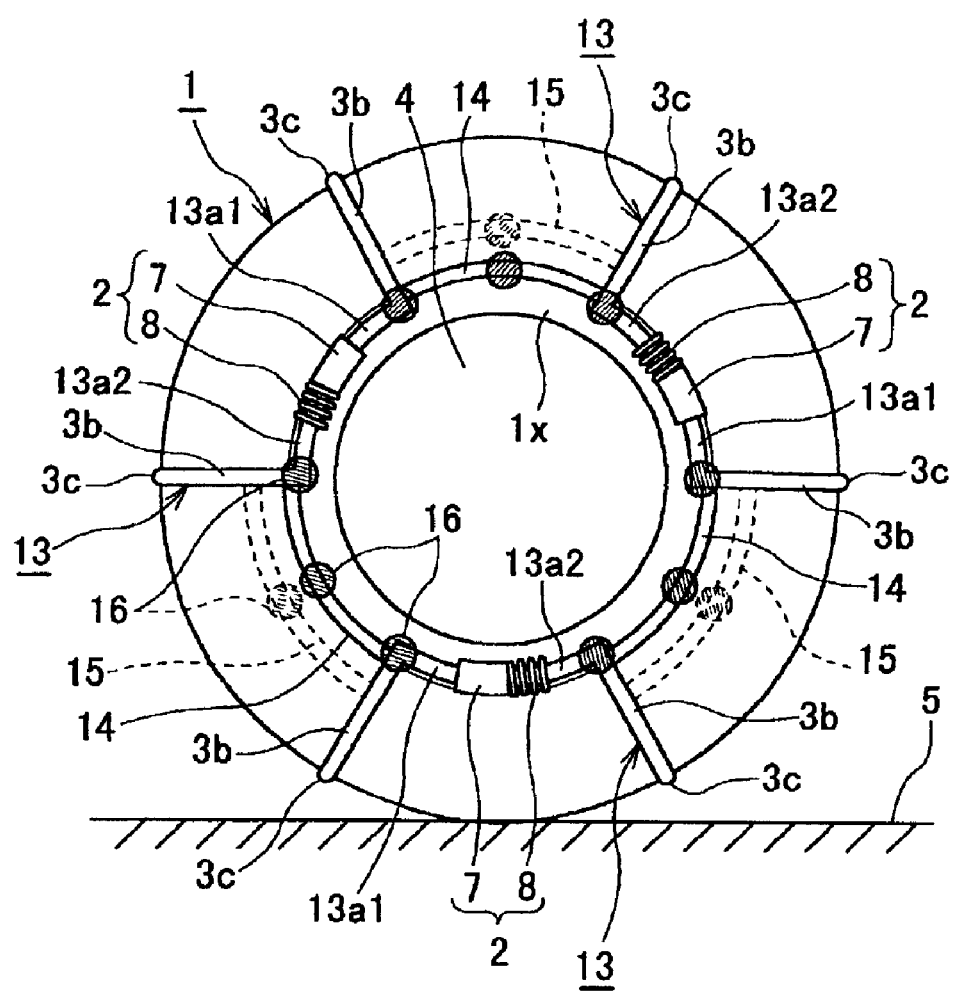
FIG. 7 is a front view of a slip-preventing device according to a second embodiment of the invention that is installed on the tire.

As shown in FIG. 7, the second embodiment of the slip-preventing device uses three arm frames 13. Each of the arm frames 13 has basically the same structure as the arm frame 3 of the first embodiment. In detail, each of the arm frames 13 has a pair of outer side components 13a1 and 13a2, a pair of crossing components 3b, 3c, 3d and an inner side component 15. A pair of the outer side components 13a1, 13a2 are arranged on the sidewall 1a of the tire 1 such that base ends thereof are spaced apart at an angular interval of about 70 degrees in the circumferential direction of the tire 1. Each of the outer side components 13a1, 13a2 in itself has an arc shape extending in the circumferential direction of the sidewall 1a at an angle of about 25 degrees. The pair of the crossing components 3b, 3c, 3d is arranged at an angle of about 70 degrees. The inner side component 15 has an arc shape extending about 70 degrees. The arm frames 13 have their leading end portions of the pair of the outer side components 13a1, 13a2 linked by the link unit 2 as in the first embodiment, thereby being installed integrally in the circumferential direction of the tire 1. Thus, in the second embodiment, the three arm frames 13 are mounted and arranged over an angle of 120 degrees in the circumferential direction of the tire 1, respectively, thereby reaching 360 degrees in total. Moreover, the opposite crossing components 3b, 3c, 3d of each of the arm frames 13 are disposed at an angular interval of about 70 degrees in the circumferential direction of the tire 1. At the same time, the adjacent crossing components 3b, 3c, 3d of the linked three arm frames 13 are disposed at an angular interval of about 50 degrees in the circumferential direction of the tire 1, respectively. The interval of disposition may be other angles than the above. For example, the arm frame may be configured such that the crossing components 3b, 3c, 3d are all disposed at an angular interval of 60 degrees.

The slip-preventing device further has a reinforcing rod of an arc shape that connects integrally and rigidly the pair of the outer side components 13a1, 13a2 and the pair of the crossing components 3b, 3c, 3d to reinforce them. In the second embodiment, another reinforcing rod of an arc shape may be further formed integrally on a desired position, e.g. a center position between the opposite ends of the bottom portion 3c of the crossing component. That is, a plurality of reinforcing rods may be arranged between the pair of the crossing components 3b, 3c, 3d so as to reinforce the arm frame 13 more strongly as a whole. Particularly, the reinforcing rod on the bottom portion 3c serves as a slip-preventing or traction element to prevent slip of the tire 1 in the lateral direction or the width direction of the tread 1c.

Figure 8:
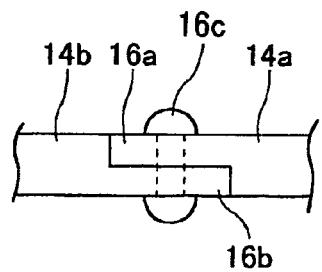
FIG. 8 is a plan view of a free joint unit, viewed in a radial direction of the tire, of the slip-preventing device according to the second embodiment of the invention.

In the second embodiment, one or more free joint units 16 are further provided on the arm frame 13. In detail, the free joint units 16 link connecting positions of the base ends of the outer side components 13a1, 13a2 and the crossing components 3b, 3c, 3d as well as connecting positions of the leading ends of the crossing components 3b, 3c, 3d and the inner side component 15, respectively. Thus, the linked portions are capable of relatively tilting or rotating along a planar direction of the side surface of the tire 1. Moreover, a nearly center part of the inner side component 15 and a nearly center part of the reinforcing rod 14 are cut apart, respectively. Then, the free joint units 16 link the nearly center part of the inner side component 15 and the nearly center part of the reinforcing rod 14, respectively. The free joint unit 16 may link the two members to be linked so as to make them relatively tiltable or rotatable in a direction perpendicular to the planar direction or in the width direction of the tire 1. Specifically, as shown in FIG. 8, each of the reinforcing rods 14 is cut apart at its nearly center part into a first portion 14a and a second portion 14b. A leading end portion 16a of the first portion 14a and a leading end portion 16b of the second portion 14b have about a half cross-section of the first portion 14a and the second portion 14b, respectively. The portions 16a and 16b are linked rotatably to each other by a pin 16c.

With the slip-preventing device according to the second embodiment, the outer side components 13a1, 13a2 are relatively rotated at the linked portion via the free joint unit 16 while following deformation of the tire 1 or the like when the arm frame 13 rotates in synchronization with the tire 1 at the time of running. Thus, the strain applied to the arm frame 13 due to stress is absorbed or moderated thereby. Moreover, the slip-preventing device can be installed on the tire 1 while deforming or adjusting the shape of the arm frame 13 as a whole in accordance with an outline of the tire 1.

Third Embodiment

Figure 9:
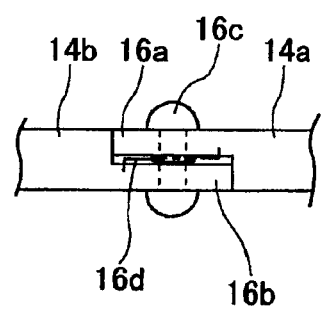
FIG. 9 is a plan view of a free joint unit with a torsion coil spring as an elastic body fitted thereon of a slip-preventing device according to a third embodiment of the invention.

Referring to FIG. 9, in the third embodiment, a torsion coil spring 16d as an elastic body is interposed between the connecting portion 16a and the connecting portion 16b along their joint surface. The torsion spring 16d has its center coil portion fitted on an outer circumference of an axis of the pin 16c. The torsion spring 16d has it one end fixed on the connecting portion 16a and the other end on the connecting portion 16b. The torsion spring 16d applies springy force on the outer side components 13a1, 13a2 and the crossing components 3b, 3c, 3d to keep them in substantially a perpendicular state or an initial state. The torsion spring 16d applies springy force on the crossing components 3b, 3c, 3d and the inner side component 15 to keep them in substantially a perpendicular state or an initial state. The torsion spring 16d applies urging force on the inner side component 15 and the reinforcing rod 14 to keep them in an arc state or an initial state. The third embodiment of the slip-preventing device can enlarge more a stress absorbing effect and a stress moderating effect by the torsion spring 16d.

Fourth Embodiment

Figure 10:
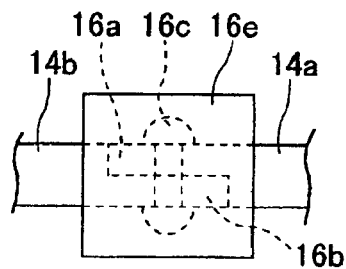
FIG. 10 is a plan view of a free joint unit with a rubber cover as an elastic body fitted thereon of a slip-preventing device according to a fourth embodiment of the invention.

A slip-preventing device according to the fourth embodiment provides an elastic body made of a rubber cover 16e on the free joint unit 16. Specifically, as shown in FIG. 10, the rubber cover 16e is provided integrally over the connecting portion 16a and the connecting portion 16b so as to cover their outside. The rubber cover 16e keeps the first portion 14a and the second portion 14b in a predetermined bent state or bent angle by its elastic force as in the third embodiment.

Fifth Embodiment

Figure 11A:
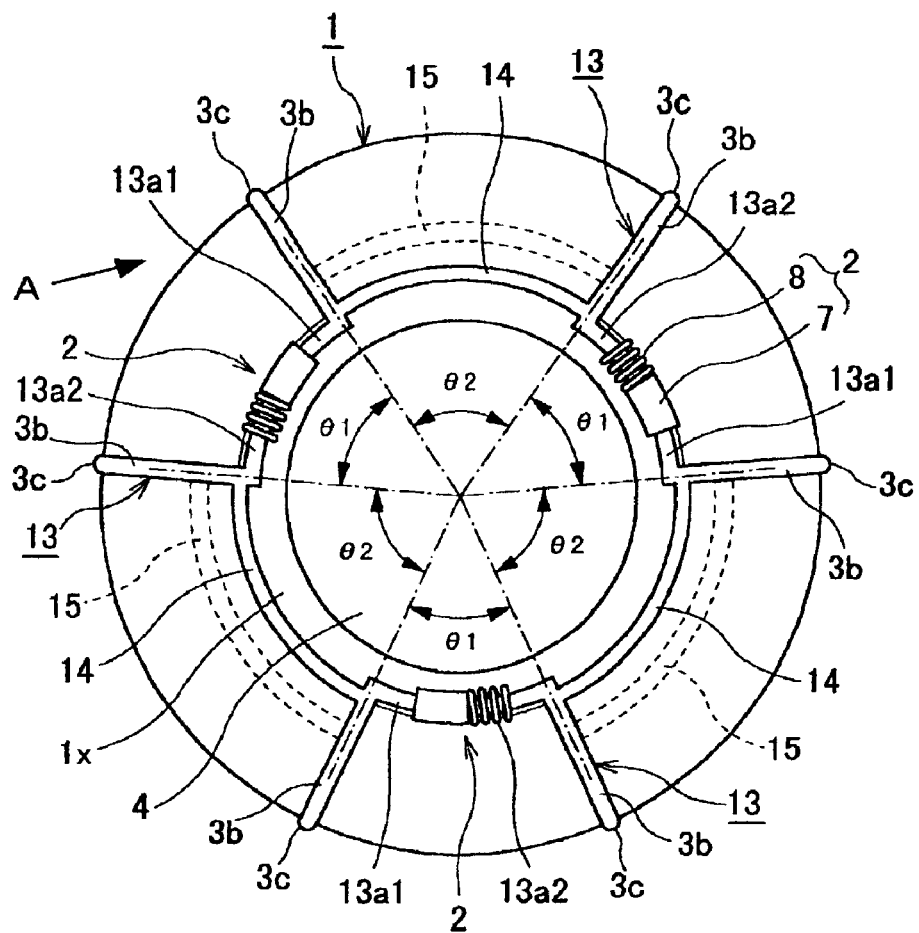
FIG. 11a is a front view showing a slip-preventing device according to a fifth embodiment of the invention that is installed on the tire.
Figure 11B:
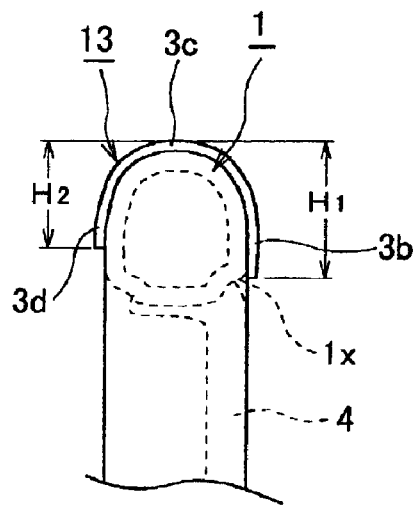

As shown in FIG. 11a, a slip-preventing device according to the fifth embodiment has essentially the same structure as the slip-preventing device according to the second embodiment. However, the fifth embodiment of the slip-preventing device has no free joint unit 16 as in the second embodiment but rigidly connects or integrally makes the entirety. Moreover, as shown in FIG. 11b, a length H2 of the inside portion 3d of the crossing component is set a little shorter than a length H1 of the outside portion 3d.

The fifth embodiment of the slip-preventing device further has an auxiliary slip-preventing or traction element 17 integrally over an entirety between the pair of the crossing components 3b, 3c, 3d of each of the arm frames 13 as shown by two-dot chain line in FIG. 11a. The auxiliary element 17 is made of a metal material, a rubber material, a synthetic resin material or the like into a ladder shape, a hexagonal pattern shape, a net shape or the like. The auxiliary element 17 constitutes a multiple of linear auxiliary slip-preventing or traction means or a planar auxiliary stop-preventing means between the pair of the crossing components 3b, 3c, 3d. Additional stop-preventing means made of a rubber material may be provided integrally on the surface of the bottom portion 3c of the crossing component in place of the auxiliary element 17 or together with the auxiliary element 17. Moreover, the stop-preventing means may be provided on the outer side component 13a1, 13a2, the inner side component 15 or the reinforcing element 14, thereby increasing frictional resistance to the sidewall 1a, 1b of the tire 1.

Sixth Embodiment

A slip-preventing device according to the sixth embodiment has three arm frames 20. As shown in FIGS. 12 and 13, each of the arm frames 20 has an outer side component 21, a crossing component 22 and a link unit 27, 28. The outer side component 21 has essentially an arc shape extending in the circumferential direction of the tire 1 along the inner peripheral edge of the sidewall 1a. The outer side component 21 is contacted and supported on the tire 1 near the beat 1x of the sidewall 1a. The outer side component 21 is arranged so as to extend over a predetermined angular interval or angular range in the circumferential direction of the sidewall 1a. The sixth embodiment of the slip-preventing device uses three arm frames 20 as in the second embodiment. However, each of the arm frames 20 has only one outer side component 21. Consequently, the outer side component 21 of each of the arm frames 20 has an arc shape extending over an angular range of about 120 degrees.

As shown in FIG. 15, the link unit 27, 28 has the same structure as the link unit 2 of the first embodiment. Specifically, a hooking portion 21a of a hook shape is integrally formed at one end or the left end in FIG. 15 of the outer side component 21. A hooking portion 21b that has a hook shape corresponds to the hooking portion 21a is integrally formed at the other end or the right end in FIG. 15 of the outer side component 21. The hooking portions 21a and 21b are engaged to link and fix the one outer side component 21 and the other outer side component 21. Moreover, a link tube 27 is mounted on the one end portion of the outer side component 21. The link tube 27 slides and covers the hooking portions 21a and 21b in a hooked state by a compression spring 28 of square coil shape.

The crossing component 22 has essentially a channel shape extending from the outer side component 21 to the sidewall 1a, the tread 1c and the sidewall 1b of the tire 1. The crossing component 22 is provided as a separate body detachably from the outer side component 21. Specifically, the crossing component 22 has a joint piece 23 of substantially an arc shape extending essentially in parallel with the side component 21. The joint piece 23 has a plurality of slots 23a formed at constant intervals in a longitudinal direction thereof. Each of the slots 23 penetrates the joint piece 23 and has a shape extending in the radial direction of the tire 1. On the other hand, pins 25 are fixed on the outer side component 21 at positions corresponding to the slots 23a, respectively. Each of the pins 25 is protruded toward the joint piece 23 and inserted into the slot 23a. Thus, the crossing component 22 is capable of moving in the radial direction of the tire 1 relative to the outer side component 21 within a range of a length of the slot 23a of the joint piece 23.

The crossing component 22 has a main board 24 of a channel cross-section integrally formed continuously from one lateral end or outer side edge in the radial direction of the joint piece 23. In detail, the main board 24 has frame pieces 24A, 24B, 24C of a U-board shape that is made of a solid board. The frame pieces 24A, 24B, 24C are located at opposite ends and a center of the main board 24, respectively, in the longitudinal direction of the main board 24. The main board 24 has traction pieces 24a, 24b, 24c of a channel board shape that is made of a net plate. The traction pieces 24a, 24b, 24c are located between the frame parts 24A, 24B, 24C, respectively.

Figure 14:
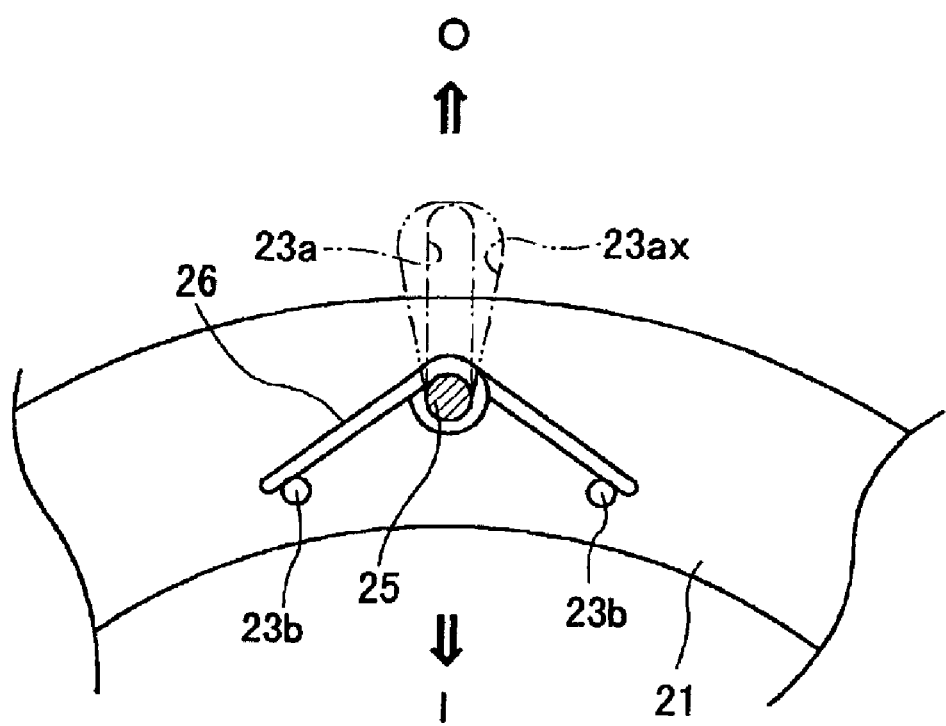
FIG. 14 is an explanatory drawing showing a front side of a linking area between an outer side component and a crossing component of the slip-preventing device according to the sixth embodiment of the invention.

As shown in FIG. 14, a torsion coil spring 26 as an elastic body is mounted on the pin 25 so as to urge the crossing component 22 toward the center of the tire 1 in relation to the outer side component 21. Specifically, a pair of little projections 23b is integrally formed at a fixed distance at both sides under the slots 23a and the pin 25 on an inside surface of the joint piece 23, i.e. the surface at a side that faces the outer side component 21. The torsion spring 26 urges the crossing portion 22 in an arrow direction 1 in FIG. 14 so as to always force an inside surface of a bottom portion 24b thereof to closely touch with the tread 1c of the tire 1.

Seventh Embodiment

Figure 16:
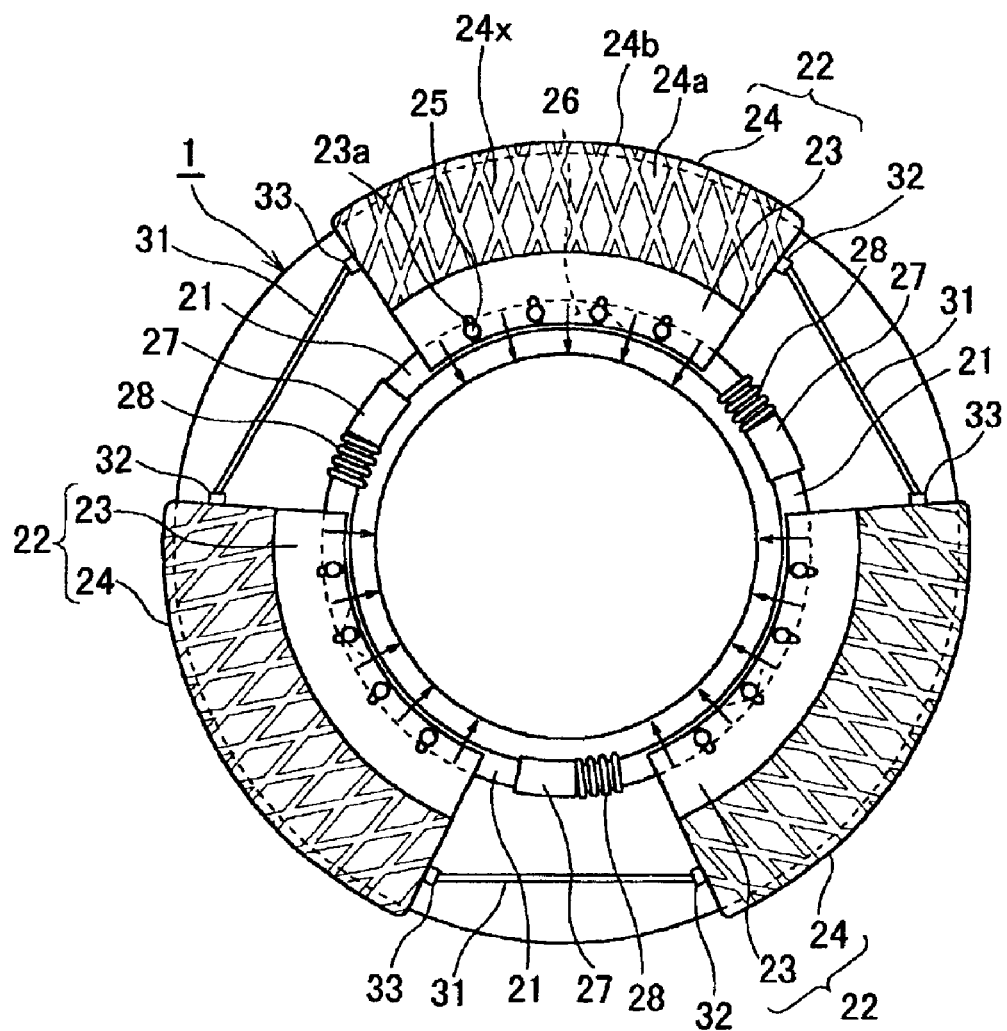
FIG. 16 is a front view of a slip-preventing device according to a seventh embodiment of the invention that is installed on the tire.

As shown in FIG. 16, a slip-preventing device according to the seventh embodiment has auxiliary link units 31, 32, 33 that link the adjacent crossing components 22 of the adjacent arm frames 20 at their middle positions in a stretchable way.

Eighth Embodiment

As shown in FIG. 17, a slip-preventing device according to the eighth embodiment has a crossing component having a pair of outside portions 43b1 and 43b2. The pair of the outside portions 43b1, 43b2 are linked with each other so as to relatively move in their longitudinal direction while overlapping an end portion or a lower end portion in FIG. 17 of the first portion 43b1 and an end portion or an upper end portion of the second portion 43b2. A compression coil spring 45 is mounted on the first portion 43b1 and the second portion 43b2 so as to elastically moderate expansion and contraction of the crossing component 43b1, 43b2, 3c, 3d. The coil spring 45 has a shape keeping force in itself so as to prevent the first portion 43b1 and the second portion 43b2 from relatively moving in their width direction and separating. An elastic body 47 may cover the first and second portions 43b1, 43b2 in place of the coil spring 45.

Ninth Embodiment

Figure 18:
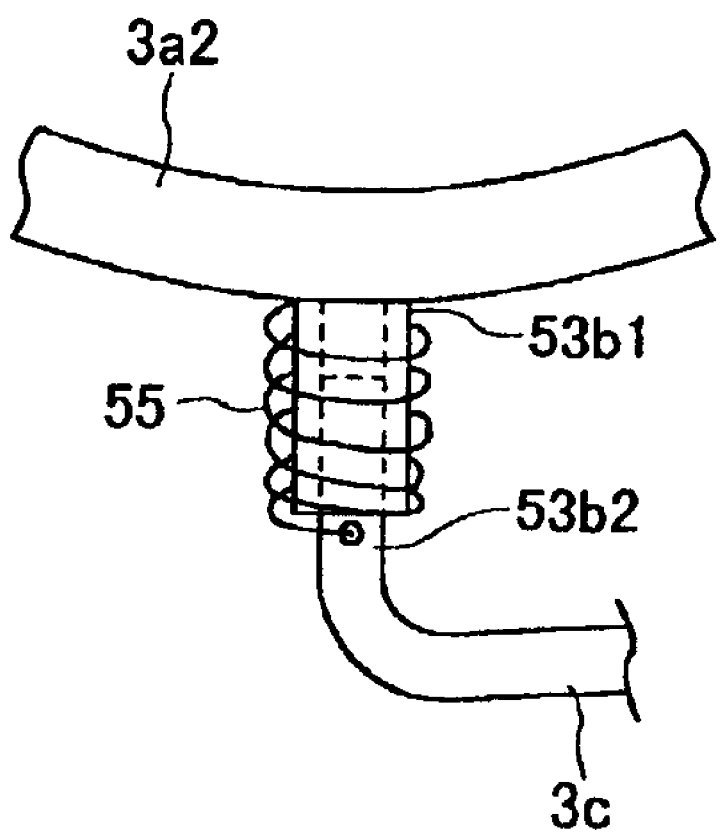
FIG. 18 is a perspective view of a main part of a slip-preventing device according to a ninth embodiment of the invention.

As shown in FIG. 18, a slip-preventing device according to the ninth embodiment has a crossing component having a pair of outside portions 53b1 and 53b2. The second portion 53b2 of a piston structure is inserted in the first portion 53b1 of a cylinder structure in a slidable way. A compression coil spring 55 is mounted on the first portion 53b1 and the second portion 53b2 so as to elastically moderate expansion and contraction of the crossing component 53b1, 53b2, 3c, 3d.

Tenth Embodiment

As shown in FIG. 19, a slip-preventing device according to the tenth embodiment has arm frames each of which has the outer side component 21 and a crossing component having frame pieces 61b, 61c, 61d of a channel board shape corresponding to the frame pieces 24A, 24B, 24C. The arm frame of the tenth embodiment has a fixing unit 65 for securing a separate tire chain 67 at nearly the longitudinal center of a bottom portion 61c of the crossing component.

Eleventh Embodiment

Figure 20:
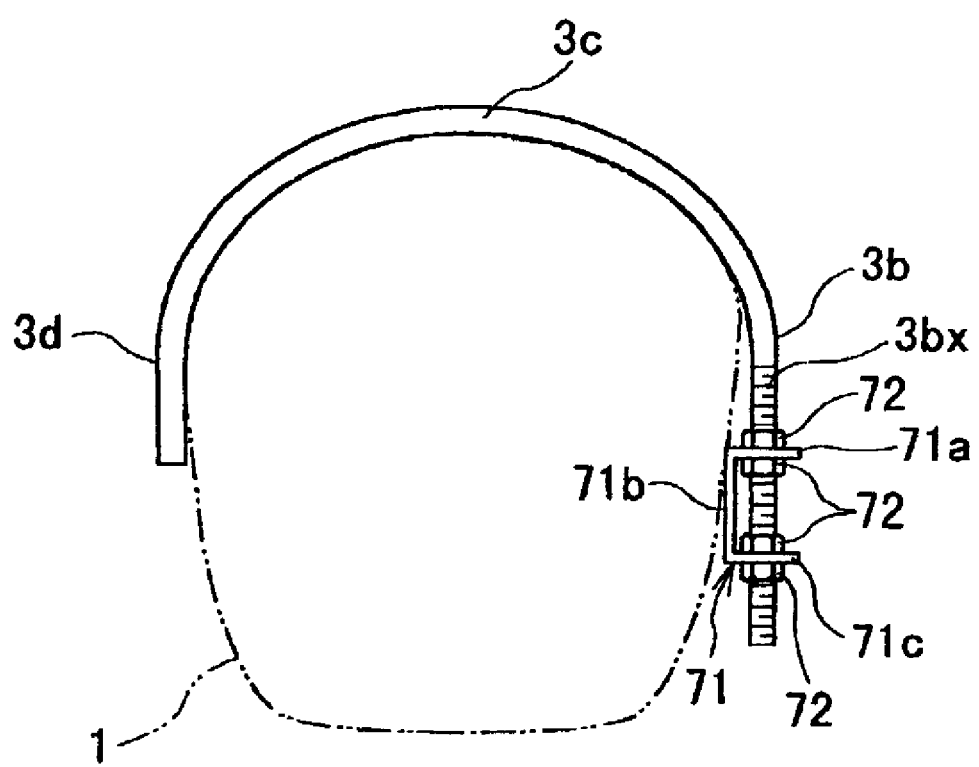
FIG. 20 is a perspective view of a main part of a slip-preventing device according to an eleventh embodiment of the invention.

As shown in FIG. 20, a slip-preventing device according to the eleventh embodiment is similar to the first embodiment of the slip-preventing device, but uses an outer side component 71 of an arc shape having a channel cross-section in place of the outer side component 3a1, 3a2. A base end portion of an outside portion 3b of a crossing component as a separate body is inserted in a through hole of each of a first side wall 71a and a second side wall 71c. Then, a first nut 72 is meshed onto a male screw 3bx of the outside portion 3b so as to abut on an inside surface the first side wall 71a. AT the same time, a second nut 72 is meshed onto the male screw 3bx of the outside portion 3b so as to abut on an outside surface the second side wall 71c. Thereafter, meshed amount of the first nut 72 and the second nut 72 is changed or adjusted to change or adjust a length of the crossing component 3b, 3c, 3d that protrudes toward the tread 1c of the tire 1 from the outer side component 71.

After the protruding length of the crossing component 3b, 3c, 3d is adjusted, such length of the crossing component 3b, 3c, 3d is fixedly maintained by a first locknut 72 and a second locknut 72. In the eleventh embodiment, a compression coil spring may be provided between the first nut 72 and the second side wall 71c, while the locknuts 72 are eliminated. In this case, the coil spring moderates movement of the crossing component toward the center of the tire 1. Moreover, the outer side component may be an arc shape having an angle cross-section, as a modification of the eleventh embodiment.

Twelfth Embodiment

Figure 21:
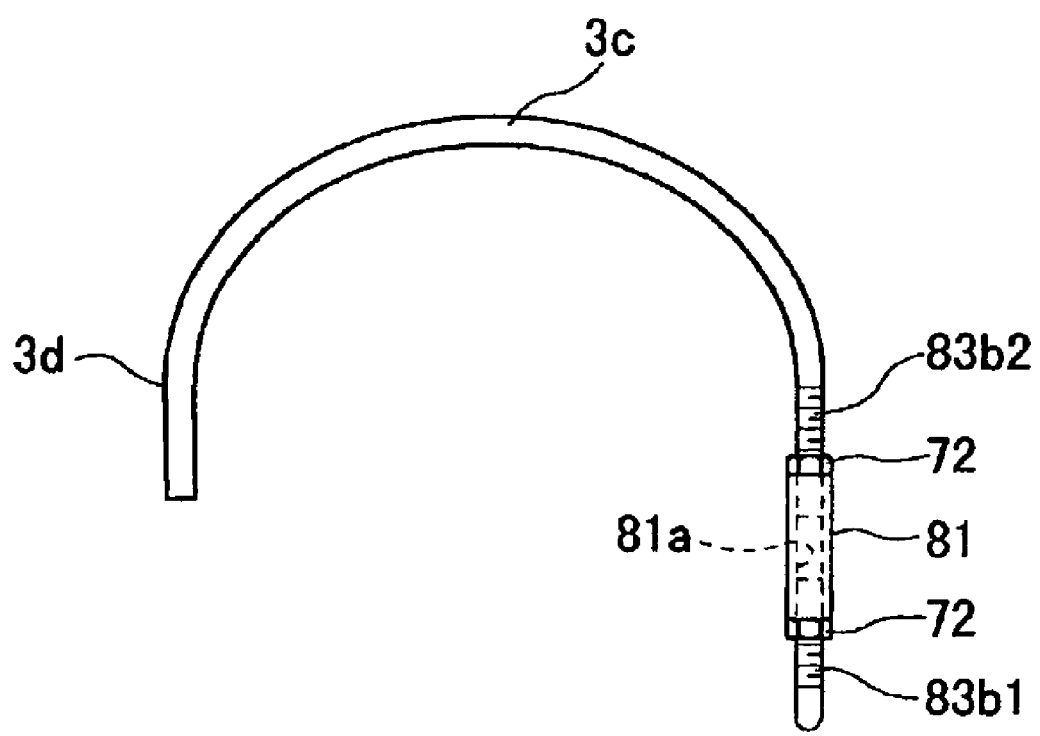
FIG. 21 is a perspective view of a main part of a slip-preventing device according to a twelfth embodiment of the invention.

As shown in FIG. 21, a slip-preventing device according to the twelfth embodiment has a crossing component composed of a first portion 83b1 and a second portion 83b2 which are formed separately. A male screw of the first portion 83b1 and a male screw of the second portion 83b2 are meshed into a long nut 81 from its opposite ends, respectively. Then, the long nut 81 is turned right and left to increase and decrease a distance between a base end of the first potion 81b1 and a leading end of the second portion 81b2. Thus, it is possible to adjust a length of the crossing component 83b1, 83b2, 3c, 3d protruding from the outer side component 3a1, 3a2 toward the tread 1c of the tire 1.

Other Modifications

A slip-preventing device may have any number of arm frames so far as it is two ore more according to the invention. If the number of the arm frames increases, the installation work is somewhat laborious, however, the slip-preventing effects improve more. It is preferable to use three or more arm frames. Still, it is possible to use two arm frames in the second embodiment or four or more arm frames in the first embodiment. The crossing component may have any form such as a board or flat bar shape, a rod shape made of one or more simple rods, a channel rod shape, a ladder rod shape, a combined shape of the ladder rod shape and a steel plate, etc. In case of the inventive slip-preventing device using two arm frames, the arm frames are disposed apart at the right and left sides and inserted between a fender and the tire of the vehicle. Then, the right and left arm frames are fitted on the tire and assembled to each other so as to cover the front and rear areas of the tire. The link unit may be composed of a bolt to define a fixed joint or a bolt to define a free joint. Alternatively, the link unit may be composed of a hook using an elastic body such as a spring so as to facilitate the installation work, adjust the radius of the joined arm frames, and elastically fit the arm frames on the tire, for example. Of course, any kind of structure can be used for the link unit. Here, the first embodiment of the slip-preventing device is preferable for a vehicle that is lightweight and that runs at a low speed such as a small car, since it has the simplest structure. Moreover, the free joint unit 16 may be constructed by combining ones that are capable of bending in a reverse direction at 90 degrees. Furthermore, the arm frame may be coated with an elastic body as a whole or in part. In addition, preferable as the material of the arm frame is the one that has property such as necessary elasticity or flexibility, strength or the like and that is hard to be abraded. It is possible to use a composite material or coated material for the arm frame.

The preferred embodiments described herein are illustrative and not restrictive, the scope of the invention being indicated in the appended claims and all variations which come within the meaning of the claims are intended to be embraced therein.

What is claimed is:

1. A slip-preventing device comprising a plurality of arm frames, each of the arm frames including a pair of crossing components bent in order being contacted with an inner sidewall, a tread and an outer sidewall of a tire, each of the arm frames including an inner side component connecting the pair of the crossing components with each other along part of an inner circumferential edge of the inner sidewall of the tire at the inner side of the tire, and each of the arm frames including a pair of outer side components each of which extends in a circumferential direction of the tire along part of an inner circumferential edge of the outer sidewall of the tire from the pair of the crossing components at the outer side of the tire, each of the arm frames having a link unit at each leading end of the outer side components so as to link detachably with the other arm frames fitted next in the installation on the tire, and the arm frames being linked by the link unit with each other in the installation on the tire.

2. A slip-preventing device according to claim 1, in which each of the arm frames further has a free joint unit.

3. A slip-preventing device according to claim 2, in which each of the arm frames further has an elastic body fitted on the free joint unit.

* * * * *